United States Patent [19]

Amos et al.

[11] Patent Number: 5,306,861
[45] Date of Patent: Apr. 26, 1994

[54] TEMPORARY WALL COVERING

[76] Inventors: Philip I. Amos; Diane L. Lickar, both of 1634 Prospect Ave., Hermosa Beach, Calif. 90254

[21] Appl. No.: 925,249

[22] Filed: Jul. 31, 1992

Related U.S. Application Data

[63] Continuation of Ser. No. 607,308, Oct. 31, 1990.

[51] Int. Cl.⁵ .................. B01D 46/06; E04H 9/00
[52] U.S. Cl. ........................ 588/249; 52/63;
    52/222; 55/356; 160/368.1; 428/131
[58] Field of Search .......... 160/327, 368.1, 354,
    160/383; 52/63, 222; 428/131, 138, 139, 140,
    136, 134, 220, 94, 474.4, 500, 480, 522, 523, 906;
    55/356; 588/249

[56] References Cited

U.S. PATENT DOCUMENTS

| | | | |
|---|---|---|---|
| 1,944,834 | 1/1934 | Bennett, Jr. | 428/139 |
| 3,063,749 | 11/1962 | Struble et al. | 160/368.1 |
| 3,480,069 | 11/1969 | Handwerker | 160/354 |
| 3,561,518 | 2/1971 | Johnson | 52/63 |
| 3,616,838 | 11/1971 | Barr | 160/368.1 X |
| 3,762,110 | 10/1973 | Boss, Jr. | 52/63 |
| 3,805,816 | 4/1974 | Nolte | 160/354 X |
| 3,913,655 | 10/1975 | Ogino | 160/354 |
| 4,289,818 | 9/1981 | Casamayor | 52/98 X |
| 4,389,827 | 6/1983 | Van Valkenburg | 52/202 X |
| 4,565,724 | 1/1986 | Smits | 428/138 |
| 4,590,714 | 5/1986 | Walker | 52/63 X |
| 4,633,899 | 1/1987 | Lord | 52/39 |
| 4,666,752 | 5/1987 | Broermann | 428/137 X |
| 4,699,842 | 10/1987 | Jorgensen et al. | 52/202 X |
| 4,726,972 | 2/1988 | Instance | 428/138 X |
| 4,732,592 | 3/1988 | Spengler | 55/356 |
| 4,804,392 | 2/1989 | Spengler | 55/356 |
| 4,815,562 | 3/1989 | Denny et al. | 182/138 |
| 4,875,549 | 10/1989 | Denny et al. | 182/138 |
| 4,883,512 | 11/1989 | Griffis | 52/63 X |
| 5,090,972 | 2/1992 | Eller et al. | 55/356 X |

FOREIGN PATENT DOCUMENTS

| | | | |
|---|---|---|---|
| 1302779 | 10/1961 | France | 428/138 |
| 21156 | 4/1961 | German Democratic Rep. | 428/138 |
| 3048707 | 3/1988 | Japan | 428/139 |

Primary Examiner—Dennis L. Taylor
Assistant Examiner—Arlen L. Olsen
Attorney, Agent, or Firm—Charles Berman

[57] ABSTRACT

A flexible sheet barrier includes a flexible sheet which has a first face to receive adhesive surface from a material being a strip of duct tape. The flexible sheet has a spaced series of apertures along at least one edge of the sheet, and inwardly spaced from the edge of the sheet. When the duct tape is placed over the apertures, the adhesive surface adheres to a substrate on the opposite face of the flexible sheet. The adhesive surface also adheres to the material on the first face of the sheet. This effectively provides a bonding of the flexible sheet to the substrate. Applied to a secured area, a room or space or floor can be lined so that safe asbestos abatement can be effected.

21 Claims, 3 Drawing Sheets

TEMPORARY WALL COVERING

This is a continuation of copending application Ser. No. 07/607,308 filed on Oct. 31, 1990.

BACKGROUND

Asbestos abatement from structures and buildings in a manner which is safe and easily effected is important.

This invention relates to a temporary barrier. In particular, the invention relates to a manner of providing a barrier for an area or structure.

It is conventional practice to provide flexible sheets of plastic to line a wall or floor in areas of construction or renovation. Similarly, drop sheets of plastic can be provided to cover a floor where painting and the like is effected.

Similarly, an air tight barrier also needs to be created for an area to be secure and to permit for abatement of asbestos. In such situations, relatively complex techniques are provided to secure the plastic sheeting or lining for the structure to be secured. Different forms of clip mechanisms, edge taping, edge glueing and anchoring are provided so that the area can be made effectively air-tight. During an asbestos abatement process, a pressure differential is created between the secured area and the space outside the secured area so as to insure that asbestos fibers do not escape uncontrollably. For this reason, it is necessary to ensure that the barrier can be securely anchored to substrates being part of the area. Known mechanisms for this are relatively complex clips, and anchors are used which also minimize the relative degree of freedom of the sheet between anchoring locations.

This invention seeks to provide a sheet, kit and a method for providing a flexible sheet barrier with improved characteristics. The invention permits for establishing a relatively inexpensive secured area.

SUMMARY

According to the invention, there is provided an article comprising a flexible sheet having a first face suitable for receiving a material with an adhesive surface so that the material can adhere to the face. There are a series of apertures through the sheet with spaces between the apertures. The apertures are located in at least one substantially straight line and are spaced from the edge of the sheet. When the material is placed over the apertures, the spaces provide for an adhesive bond between the material and the face. The apertures provide sufficient exposure so that the adhesive surface of the material through the apertures can effectively be bonded to a substrate on the opposite face of the first face. In this manner, the flexible sheet is effectively bonded to the substrate.

An invented kit includes the flexible sheet and the adhesive material. Preferably, the adhesive material is in the form of duct tape which is a pre-rolled reel. The duct tape can thereby be unrolled so that one surface, namely, the adhesive surface bonds to the spaces while the other surface projects through the apertures.

The invented method includes the setting up the flexible sheet to form the temporary barrier. By having multiple spaced lines of apertures at predetermined distances along the length of the sheet, and extending between opposite sides of the flexible sheet, the sheet can be made to adhere to the first, second and subsequent substrate on which the barrier is to be constructed. The first line of apertures could be at the leading edge of the sheet and subsequent lines could be at intervals of at least about four feet, about six feet and about eight feet and extending from side to side of the sheet.

The invention is now further described with reference to the accompanying drawings.

DRAWINGS

DESCRIPTION

Figure 1:
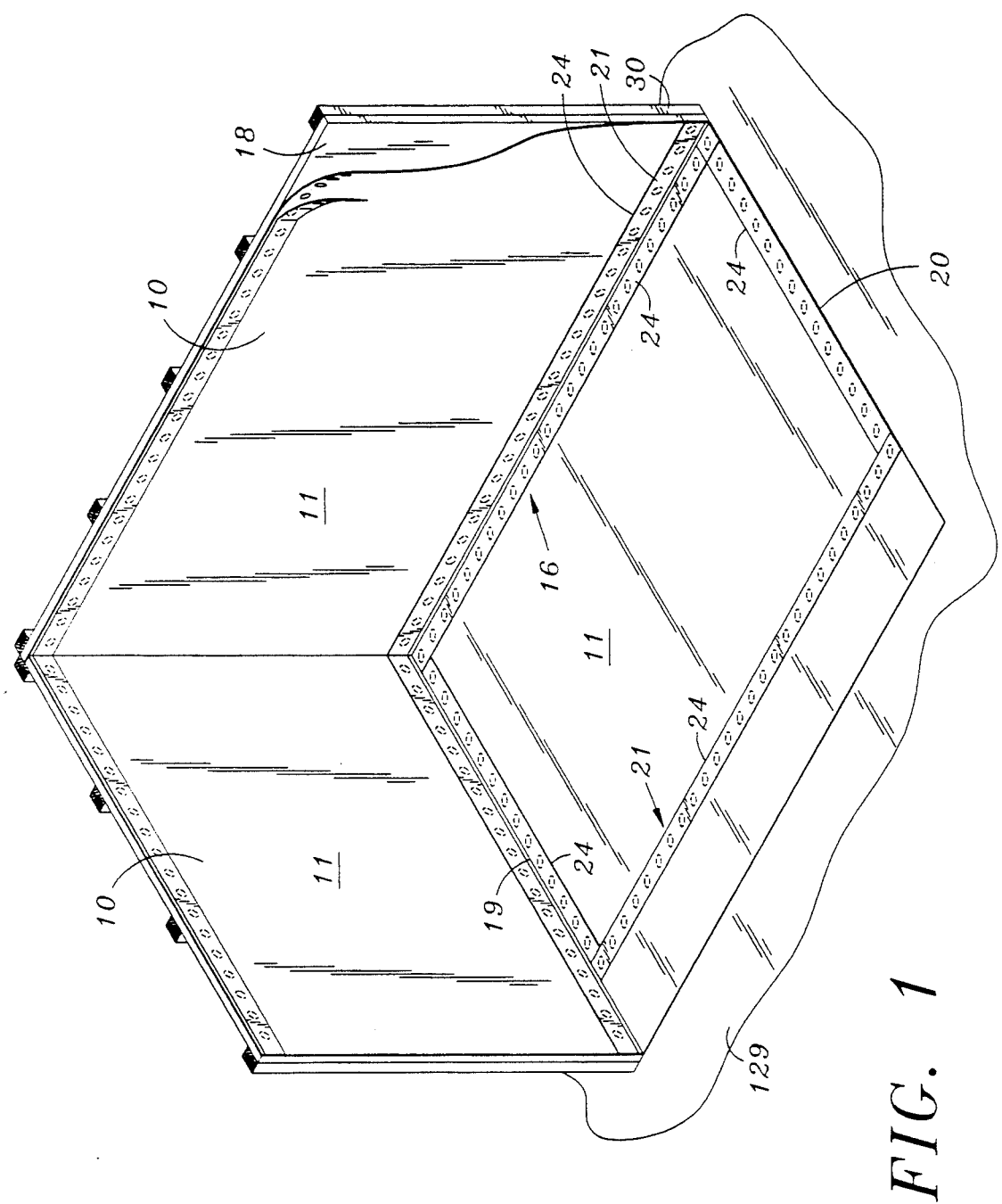
FIG. 1 is a front perspective view showing two walls and a floor formed by the flexible sheet barrier.

A flexible sheet 10 includes a first face 11 suitable for receiving a material 12 having an adhesive surface 13 so that it can adhere to the material 10.

A series of apertures 14 is provided through the sheet 10 and there are spaces 15 between the apertures 14. The apertures 14 are located to constitute at least one substantially straight line 16. The line 16 is spaced from the edge 17 of the sheet 10. The apertures 14 are sufficiently large in size relative to the spaces 15 so that when the adhesive material 12 is placed over the apertures 14, the spaces 15 provide for an effective adhesive bond between the material 12 and the face 11. The apertures 14 provide sufficient exposure of the adhesive surface 13 through the apertures 14. In this manner, the sheet 10 can be effectively bonded to a substrate 18 located on an opposite face to the first face.

The flexible sheet 10 is formed preferably of a synthetic resinous compound. The compound is selectively a polyethylene, polypropylene, polyester, polyamide, or polyacrylonitrile. The thickness of the sheet 10 can vary between a few millimeters to several millimeters depending on the nature of the flexible barrier to be constructed by the flexible sheet. Preferably, the thickness is between about 1 millimeter and about 20 millimeters in thickness. The sheet 10 defines sides 19 and 20 and the distance between sides 19 and 20 can vary so that the sheet forms different widths. The widths could be between 3 feet and 20 feet according to desired applications.

The series of apertures 14 are directed across the width of the sheet 10 substantially from side 19 to side 20. A second series of apertures would form a line 21 extending also across the width between sides 19 and 20. Lines 16 and 21 thereby form a pair of substantially straight lines. The spacing between the lines can vary according to applications. The spacing is at least about four feet but could also be about six feet or about eight feet.

Each aperture defines a width 22. The width is defined as being in the direction between the opposite sides 19 and 20. The width of each aperture 22 is substantially equal to the width 23 of the spaces 15 between the apertures 14.

The apertures also define a length 24 which is defined right angularly relative to the width 22. The length 24 is substantially equal to the width 22. The apertures 14 can have different cross-sectional shapes such as rectangular, circular, elliptical or other desired shapes. The preferred shape is substantially elliptical in cross-section. The length and width of the aperture can range between about ½ inch to 5 inches in length and about 2 inches to 3 inches in width, the width being defined by the direction at right angles to the lines formed by a series of apertures.

The material 12 with an adhesive surface 13 constitutes an elongated strip 24 having a width 25 at least equal to 1 and ½ times the width of the apertures 14. The elongated strip 24 is pre-rolled on a reel 26 and the strip 24 is a tape having a base material including at least one of a cellulose compound or a synthetic resinous compound. The strip is preferably duct tape and is separable from the reel to form the strip 24 for adherence to the face 11 of the flexible sheet 10. The duct tape may be made of the conventionally used materials and compounds and may include reinforcing elements and lengths for ensuring integrity and strength. Such elements may form a woven fabric base on which a second sealing material is coated with an adhesive layer on one side of the tape.

Figure 2:
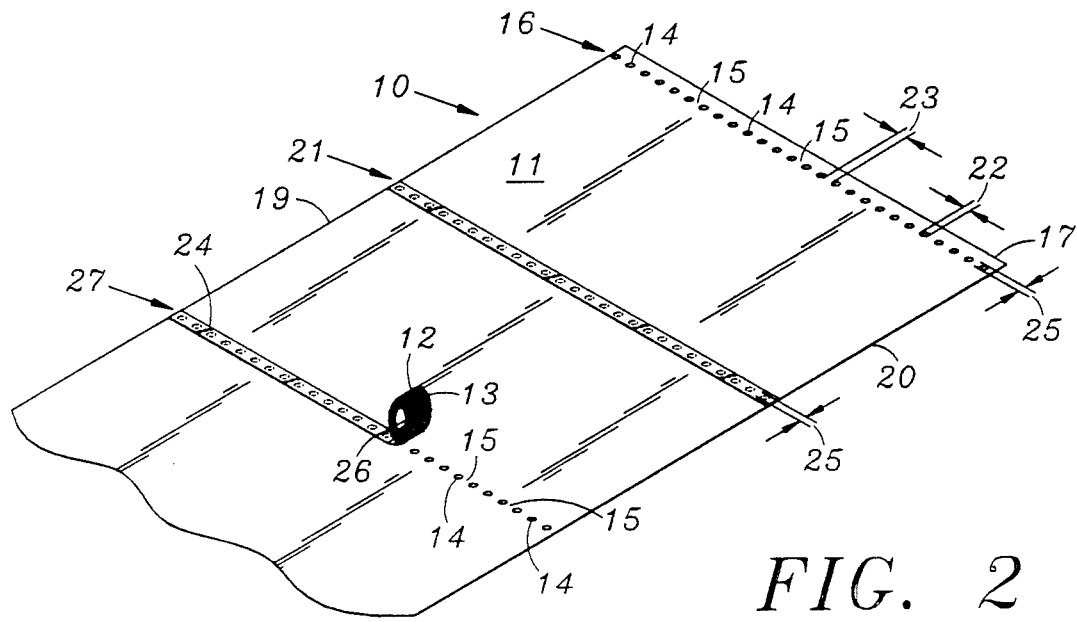
FIG. 2 is a flexible sheet showing duct tape being rolled onto the flexible sheet material.

The sheet with apertures can be packaged separately or together with the adhesive material 12 in a kit form. The sheet 10 can provide multiple lines 16, 21 and 27 of apertures 14 and, as illustrated in FIG. 2, the sheet 10 is substantially rectangular in cross-section. Apertures could also be selectively located along the sides 19 and 20. This is illustrated in FIG. 1 and in FIG. 1 the apertures on the side constitute lines 28 and 29. The apertures running between the sides are illustrated as lines 16 and 21. In this manner, the apertures form 4 lines closing off a substantially rectangular face.

The method of creating a flexible barrier between substrates is achieved by placing the flexible sheet 10 with the line of apertures 16 adjacent a first substrate 18. The adhesive material 12 is then rolled out over the apertures so that the adhesive face 13 passes through the apertures and is affixed to the first substrate 18. The adhesive material opposite the spaces adheres to the face 11 of the flexible sheet 10.

Figure 3:
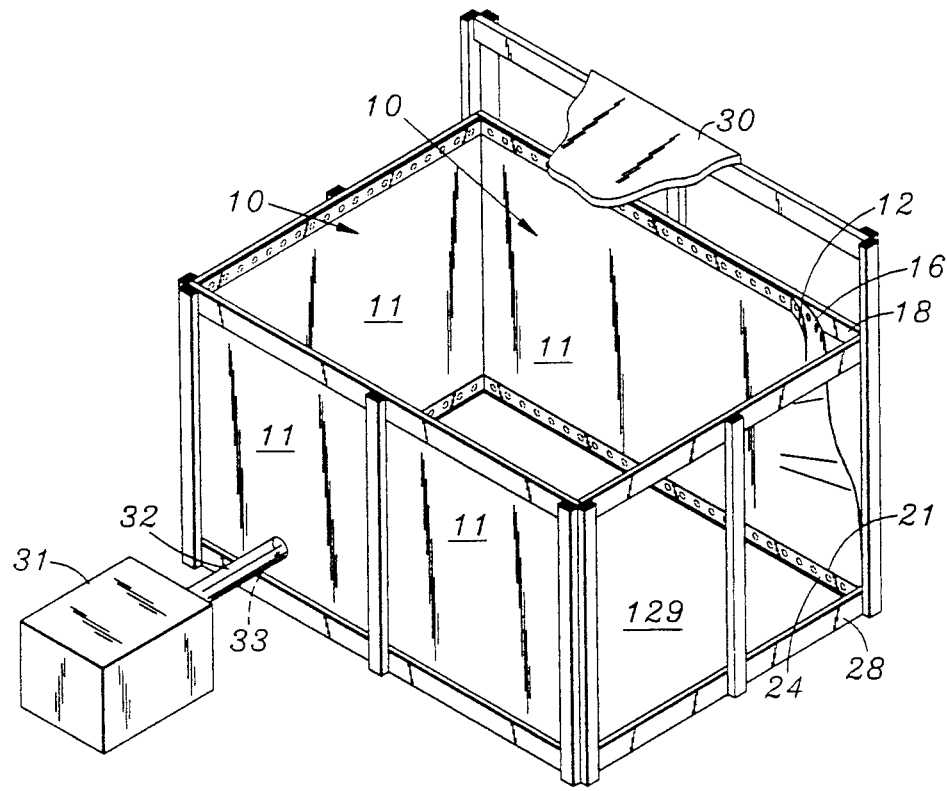
FIG. 3 is a perspective view illustrating a structure from which asbestos abatement is to be effected and showing a ceiling in partial view.
Figure 4:
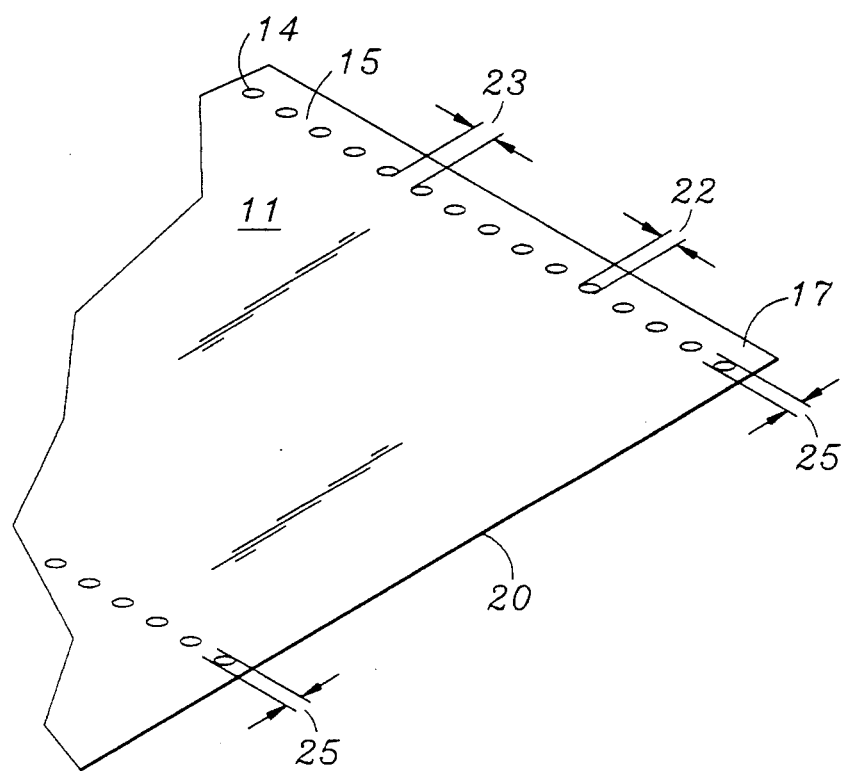
FIG. 4 is a partial view of FIG. 2 showing sections enlarged.

In FIG. 1, the substrate 18 is a drywall and the sheet 10 is placed on that drywall. In FIG. 3, the substrate 18 is a crossbeam near the interface between a ceiling and the location of where a wall would normally be.

The flexible sheet 10 is then extended between the first substrate 18 and a removed further substrate 28 which could be at the interface between the wall and a floor 129. The second line 21 of apertures 14 would be located at the interface. The strip 24 is then placed over the apertures 14 so that the tape through the apertures engages the second substrate 28 while the adhesive surface 13 opposite the first face 11 engages the face 11 at place. In this manner, the flexible sheet 10 is securely anchored between the first substrate 18 and second substrate 28 and forms a flexible barrier relative to the substrates. In FIG. 1, the first substrate 18 continues to the base 30 and the second line 21 of apertures is located at the base region 30 and the strip 24 adheres to that portion of the substrate. Also in FIG. 1, a sheet material 10 is located over the floor and in this manner the sheet 10 forms a drop sheet over the floor 129 in FIG. 1. The strips 24 form a rectangular shape and secure the drop sheet 10 to the floor. With the arrangement of FIG. 1, a ceiling could be painted or renovations could take place in the structure without risk to the underlying wall or substrate 18 or floor 129.

In the embodiment of FIG. 3, the construction is set out to illustrate a means for abating asbestos which may be in an area between a ceiling which is shown partly by numeral 30 and between the substrates 18 and 28 and floor 129. In such a construction, the flexible sheet material 10 would be placed totally around the structure or area to be secured. The flexible material 12 is located on the flexible sheet 10 in the manner described so as to secure the flexible sheet 10 to the substrates. If necessary, the sheet is also placed on the floor 129. A mechanism 31 is connected through ducting 32 to an aperture 33 in the secured structure and a pressure differential is developed between the secured structure and the area about the secured structure. Asbestos fibers which are then loosened from the area can be removed with safety and without endangering the adjacent environment.

Many more examples of the invention exist, each differing from the other in matters of detail only. For example, there can be multiple spaced lines of apertures parallel to each other along each side or edge of the sheet. Instead of elliptical apertures, the apertures may have other suitable cross-sections such as circular or rectangular. Materials other than duct tape could be used. This may be masking tape or other tape on which there is an adhesive surface. It should be understood that the invention is to be limited solely by the appended claims.

We claim:

1. A flexible barrier between substrates comprising in combination a flexible sheet and a material with an adhesive surface, the flexible sheet having a first face suitable for receiving the material with an adhesive surface so that the material adheres to a first substrate, the first substrate being at a position adjacent an interface of a ceiling and a wall, a series of apertures through the sheet and spaces between the apertures located opposite the first substrate portion, the apertures being sufficiently large in size relative to the spaces so that when the adhesive surface material is placed over the apertures, the spaces provide an adhesive bond between the material and the first face, and the apertures provide sufficient exposure of the adhesive surface through the apertures to the first substrate, the adhesive material being in physical contact with the sheet and being over the apertures so as to effect adhesion of the material to the first substrate, the flexible sheet being extended to a second substrate spaced from the first substrate, the second substrate being at a position adjacent the interface of a wall amd a floor, the sheet having a second series of apertures through the sheet with spaces between the apertures, the spaces being adjacent the second substrate, the material with an adhesive surface being in physical contact with the sheet and being across the second series of apertures such that the adhesive surface opposite the second series of apertures adheres to the second substrate and the material over the spaces between the second series of apertures adheres to these spaces whereby the sheet is effectively secured between the first substrate and the second substrate.

2. A flexible barrier as claimed in claim 1 wherein the first and second series of apertures in the sheet are defined as spaced lines of apertures at predetermined distances beginning from a leading edge of the sheet, the lines extending transversely from one side of the sheet to the other.

3. A barrier as claimed in claim 1 wherein the flexible sheet is formed of a synthetic resinous compound, the compound being selectively a polyethylene, polypropylene, polyester, polyamide, or polyacrylonitrile.

4. A barrier as claimed in claim 1 wherein the apertures each define a width, the width being in the direction between opposite sides of the sheet, and wherein the extent of the width is substantially equal to the space between adjacent apertures.

5. A barrier as claimed in claim 4 wherein the length of the aperture is defined right angularly relative to the width, and wherein the length is substantially equal to the width of the apertures.

6. A barrier as claimed in claim 5 wherein at least one of the length or width of each aperture is in a range of between about ½ inch and 5 inches.

7. A barrier as claimed in claim 1 wherein the apertures are substantially circular in cross-section.

8. A barrier as claimed in claim 1 wherein the apertures are in lines spaced apart by at least about four feet.

9. A barrier as claimed in claim 1 wherein the apertures are in lines spaced apart by at least about six feet.

10. A barrier as claimed in claim 1 wherein the apertures are in lines spaced apart by at least about eight feet.

11. A barrier as claimed in claim 1 wherein the material includes the elongated strip having a width at least equal to a length of the apertures, the length being defined by the direction at right angles to lines formed by a series of apertures.

12. A barrier as claimed in claim 11 wherein the elongated strip is pre-rolled on a reel, and the strip is a tape having a base material including at least one of a cellulose compound or a synthetic resinous compound.

13. A barrier as claimed in claim 11 wherein the strip is masking tape, the tape being pre-wound on a reel and being separable from the reel to form the strip for adherence to the flexible sheet.

14. A flexible barrier for abating a substance from a predetermined area comprising an area lined with a flexible sheeting thereby to provide a substantially secured area from which the substance can be abated without the release of the substance beyond the secured area, including in combination the flexible sheet and a material having an adhesive surface, the sheet having a first face suitable for receiving the material with an adhesive surface so the material can adhere to the face, the sheet having a series of apertures through the sheet with spaces between the apertures, the apertures being located in at least one substantially straight line and being spaced from an edge of the sheet, the apertures providing sufficient exposure of adhesive material through the apertures such that the sheet can be effectively bonded to a first substrate in the area to be secured located on an opposite face of the first face, and the adhesive material extended across the apertures whereby the adhesive surface partly adheres to the sheet about the spaces and partly to the first substrate, and wherein a second series of apertures through the sheet is located opposite a second substrate in the area to be lined and including adhesive material extended across the apertures and spaces whereby the adhesive surface effectively bonds the sheet to the second substrate, wherein the sheet form a secured area, such that the air pressure of the secured area relative the area beyond the secured area can be changed by pressure differentiating means provided in the sheet thereby to permit for abatement from the secured area, and wherein the first substrate is located adjacent an interface of a ceiling and a wall, and a second substrate is located adjacent an interface of a floor and a wall.

15. A barrier as claimed in claim 14 wherein the flexible sheet is formed of a synthetic resinous compound, the compound being selectively a polyethylene, polypropylene, polyester, polyamide, or polyacrylonitrile.

16. A barrier as claimed in claim 14 wherein the apertures each define a width, the width being in the direction between opposite sides of the sheet, and wherein the extent of the width is substantially equal to the space between adjacent apertures.

17. A barrier as claimed in claim 16 wherein the length of the aperture is defined right angularly relative to the width, and wherein the length is substantially equal to the width of the apertures.

18. A barrier as claimed in claim 14 wherein the material includes the elongated strip having a width at least equal to a length of the apertures, the length being defined by the direction at right angles to lines formed by a series of apertures.

19. A barrier as claimed in claim 18 wherein the elongated strip is pre-rolled on a reel, and the strip is a tape having a base material including at least one of a cellulose compound or a synthetic resinous compound.

20. A barrier as claimed in claim 18 wherein the strip is masking tape, the tape being pre-wound on a reel and being separable from the reel to form the strip for adherence to the flexible sheet.

21. A barrier as claimed in claim 14 including a second sheet with a further series of spaced apertures to further substrates in the area to be secured whereby the first and second sheets form at least part of the secured area.

* * * * *